United States Patent
Nagahara et al.

(10) Patent No.: US 7,612,713 B2
(45) Date of Patent: Nov. 3, 2009

(54) FIRST OUTPUT POSITION CALCULATION METHOD, STORAGE MEDIUM, POSITIONING DEVICE, AND ELECTRONIC INSTRUMENT

(75) Inventors: Mikio Nagahara, Nagano (JP); Shinichi Mitsunaga, Kanagawa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/062,159

(22) Filed: Apr. 3, 2008

(65) Prior Publication Data
US 2008/0246661 A1 Oct. 9, 2008

(30) Foreign Application Priority Data
Apr. 9, 2007 (JP) ............... 2007-101477
Feb. 19, 2008 (JP) ............... 2008-037115

(51) Int. Cl.
*G01S 1/02* (2006.01)
(52) U.S. Cl. ............... 342/357.12; 342/357.06; 342/357.15
(58) Field of Classification Search ............ 342/357.02, 342/357.08, 357.13, 457, 357.06, 357.12, 342/357.15; 455/456.2, 456.6
See application file for complete search history.

(56) References Cited

U.S. PATENT DOCUMENTS
2003/0156058 A1 8/2003 Edwards et al.

FOREIGN PATENT DOCUMENTS
JP 2003-240836 A 8/2003

*Primary Examiner*—Dao L Phan
(74) *Attorney, Agent, or Firm*—Global IP Counselors, LLP

(57) ABSTRACT

In the first positioning, a positioning process that calculates the present position based on acquired GPS satellite signals (step A3) is performed a plurality of times. A number of times that the difference (position difference) ΔP between the calculated present located position and the preceding located position is successively equal to or less than a given value is counted using a position counter, and a number of times that the difference (time difference) ΔT between the present time error and the preceding time error is successively equal to or less than a given value is counted using a time counter each time the positioning process is performed (step A5). A position threshold value and a time threshold value are determined by changing a reference threshold value by an amount corresponding to an APR average value (step A7). When the position count value has reached the position threshold value (step A9: YES) and the time count value has reached the time threshold value (step A11: YES), the present position is determined to be the first located position and output (step A13).

16 Claims, 8 Drawing Sheets

MULTIPATH ENVIRONMENT

| TIME | SELECTED SATELLITE SET | APR AVERAGE VALUE | HORIZONTAL ERRORS | |
|---|---|---|---|---|
| t1 | #1, #2, #3, #4, #5 | 83.443 | 34.30642 | |
| t2 | #2, #3, #4, #6, #7 | 75.306 | 184.1487 | BEFORE Z-count IS DECODED |
| t3 | #2, #3, #4, #5, #6 | 71.148 | 139.383 | |
| t4 | #2, #3, #4, #5, #6 | 69.484 | 136.7202 | |
| t5 | #1, #2, #3, #4, #5 | 53.814 | 27.0614 | |
| t6 | #1, #2, #3, #4, #5 | 49.082 | 27.08194 | AFTER Z-count HAS BEEN DECODED |
| t7 | #1, #2, #3, #4, #5 | 37.789 | 27.16214 | |
| t8 | #1, #2, #3, #4, #5 | 24.98 | 27.30937 | |
| t9 | #1, #2, #3, #4, #5 | 32.848 | 27.20688 | |

OPEN-SKY ENVIRONMENT

| TIME | SELECTED SATELLITE SET | APR AVERAGE VALUE | HORIZONTAL ERRORS | |
|---|---|---|---|---|
| t31 | #2, #3, #5, #8, #9, #11 | 5.6569 | 2.162186 | |
| t32 | #2, #3, #5, #8, #9, #13 | 8.6603 | 10.54744 | BEFORE Z-count IS DECODED |
| t33 | #2, #3, #5, #8, #9, #10, #15 | 15.075 | 25.46058 | |
| t34 | #2, #3, #5, #8, #9, #10, #16 | 7.2111 | 5.040994 | |
| t35 | #2, #3, #5, #10, #12 | 3.6056 | 1.82043 | |
| t36 | #2, #3, #5 | 5.96 | 2.507946 | AFTER Z-count HAS BEEN DECODED |
| t37 | #2, #3, #5, #14 | 5.8556 | 8.643111 | |
| t38 | #2, #3, #5 | 6.2183 | 1.707992 | |
| t39 | #2, #3, #5, #10, #17 | 4.9467 | 1.44934 | |
| t40 | #2, #3, #5, #9, #10 | 4.2706 | 1.620637 | |

FIG. 4

COUNT-UP CONDITION TABLE  321

| POSITION COUNTER | POSITION DIFFERENCE ΔP IS EQUAL TO OR LESS THAN 200 METERS |
|---|---|
| TIME COUNTER | TIME DIFFERENCE ΔT IS EQUAL TO OR LESS THAN 0.02 SECONDS |

FIG. 5

THRESHOLD VALUE CHANGE CONDITION TABLE 323

| | CONDITION (323a) | AMOUNT (323b) |
|---|---|---|
| NUMBER OF SATELLITES | 6~ | −1 |
| PDOP VALUE | 0~5 | −1 |
| | 6~ | +1 |
| APR AVERAGE VALUE | 10~ | +3 |
| | 7~9 | +2 |
| | 4~6 | +1 |
| | 2~4 | −1 |
| | 0~1 | −2 |

FIG. 6

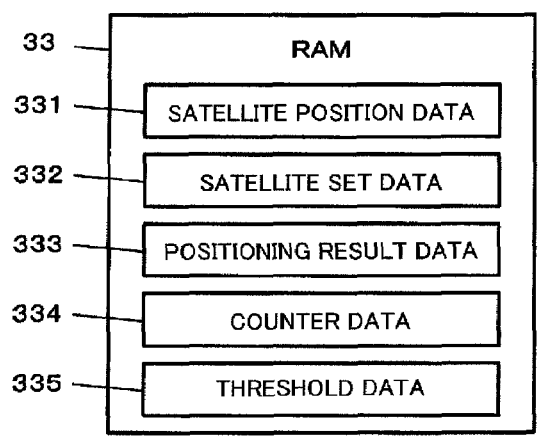

- 33 RAM
- 331 SATELLITE POSITION DATA
- 332 SATELLITE SET DATA
- 333 POSITIONING RESULT DATA
- 334 COUNTER DATA
- 335 THRESHOLD DATA

FIG. 7

SATELLITE POSITION DATA

| GPS SATELLITE | POSITION |
|---|---|
| #1 | (X1, Y1, Z1) |
| #2 | (X2, Y2, Z2) |
| ⋮ | ⋮ |

FIG. 8

SATELLITE SET DATA
332

| SATELLITE SET | GPS SATELLITE | PRESENT POSITION CANDIDATE | TIME ERROR CANDIDATE | NUMBER OF SATELLITES | PDOP VALUE | APR VALUE |
|---|---|---|---|---|---|---|
| A | #1, #2, #3, #4, #5, #6 | Pa(xa, ya, yz) | Ta | 6 | 2.5 | 12.1 |
| B | #1, #2, #3, #4, #6, #8 | Pb(xb, yb, yb) | Tb | 6 | 1.9 | 1.5 |
| C | #2, #3, #5, #8, #9 | Pc(xc, yc, yc) | Tc | 5 | 4.3 | 22.5 |
| ... | ... | ... | ... | ... | ... | ... |

332a 332b 332c 332d 332e 332f 332g

POSITIONING RESULT DATA

| TIME | SELECTED SATELLITE SET | POSITIONING RESULT | TIME ERROR | NUMBER OF SATELLITES | PDOP VALUE | APR AVERAGE VALUE |
|---|---|---|---|---|---|---|
| t01 | C | (x1, y1, z1) | T1 | 6 | 2.9 | 16.3 |
| t02 | A | (x2, y2, z2) | T2 | 5 | 3.1 | 11.4 |
| t03 | D | (x3, y3, z3) | T3 | 6 | 1.8 | 13.3 |
| ⋮ | ⋮ | ⋮ | ⋮ | ⋮ | ⋮ | ⋮ |

//

FIRST OUTPUT POSITION CALCULATION METHOD, STORAGE MEDIUM, POSITIONING DEVICE, AND ELECTRONIC INSTRUMENT

Japanese Patent Application No. 2007-101477 filed on Apr. 9, 2007 and Japanese Patent Application No. 2008-37115 filed on Feb. 19, 2008, are hereby incorporated by reference in their entirety.

BACKGROUND OF THE INVENTION

The present invention relates to a first output position calculation method, a storage medium, a positioning device, and an electronic instrument.

The global positioning system (GPS) is widely known as a satellite positioning system, and is utilized for a car navigation system and the like. In the GPS, GPS satellite signals are respectively transmitted from a plurality of GPS satellites which orbit the earth, and a GPS receiver calculates (locates) its present position based on the received GPS satellite signals.

A GPS satellite signal affected by a multipath or the like may be included in the acquired GPS satellite signals. The term "multipath" refers to a phenomenon in which an indirect wave reflected or diffracted by a building or topography is superimposed on a direct wave from a GPS satellite so that the GPS receiver receives identical radio waves through multiple paths. Such a reception environment is referred to as a multipath environment. The present position may not be accurately calculated (located) when using a GPS satellite signal affected by a multipath. Specifically, it is necessary to perform positioning calculations while excluding a GPS satellite signal affected by a multipath or the like from the acquired GPS satellite signals. As a method of determining a GPS satellite signal affected by a multipath or the like, a method using an a priori residual (APR) has been known (see JP-A-2003-240836, for example).

A GPS receiver repeats positioning calculations each time a given period of time (e.g., one second) has elapsed, and outputs the calculated present position of the GPS receiver as the positioning result. About several seconds are normally required to output the first positioning result after starting positioning. A time to first fix (TTFF; time required to output the first positioning result) and positioning accuracy have a relationship in which the positioning accuracy decreases when giving priority to a reduction in TTFF and the TTFF increases when giving priority to an increase in positioning accuracy. Whether to give priority to an increase in positioning accuracy or a reduction in TTFF is determined depending on the reception environment. For example, it is desirable to give priority to an increase in positioning accuracy over a reduction in TTFF in a reception environment (e.g., multipath environment) with poor positioning accuracy so that the positioning result is output after the Z-count has been decoded and the positioning accuracy has been improved, even if the TTFF increases. On the other hand, priority may be given to a reduction in TTFF in an open-sky environment with high positioning accuracy so that the positioning result is output without waiting for the Z-count to be decoded.

SUMMARY

According to one aspect of the invention, there is provided a first output position calculation method comprising:

selecting satellite sets, each of the satellite sets being a combination of satellites used for a present positioning process;

calculating present position candidates corresponding to the respective satellite sets using satellite signals from the satellites included in the respective satellite sets;

calculating APR values of the satellites of the respective satellite sets based on the present position candidates;

calculating an APR average value of the present positioning process by averaging the APR values of the respective satellite sets;

selecting a present position candidate from the present position candidates corresponding to the respective satellite sets and determining the selected present position candidate to be a located position determined by the present positioning process;

changing a repetitive execution count of the positioning process based on the APR average value; and determining a final located position calculated when the positioning process has been executed in a number corresponding to the repetitive execution count to be a first located position to be output.

BRIEF DESCRIPTION OF THE SEVERAL VIEWS OF THE DRAWING

FIG. 4 shows a data configuration example of a count-up condition table.

FIG. 5 shows a data configuration example of a threshold value change condition table.

FIG. 6 is a configuration diagram of a RAM.

FIG. 7 shows a data configuration example of satellite position data.

FIG. 8 shows a data configuration example of satellite set data.

DETAILED DESCRIPTION OF THE EMBODIMENT

Figure 1:
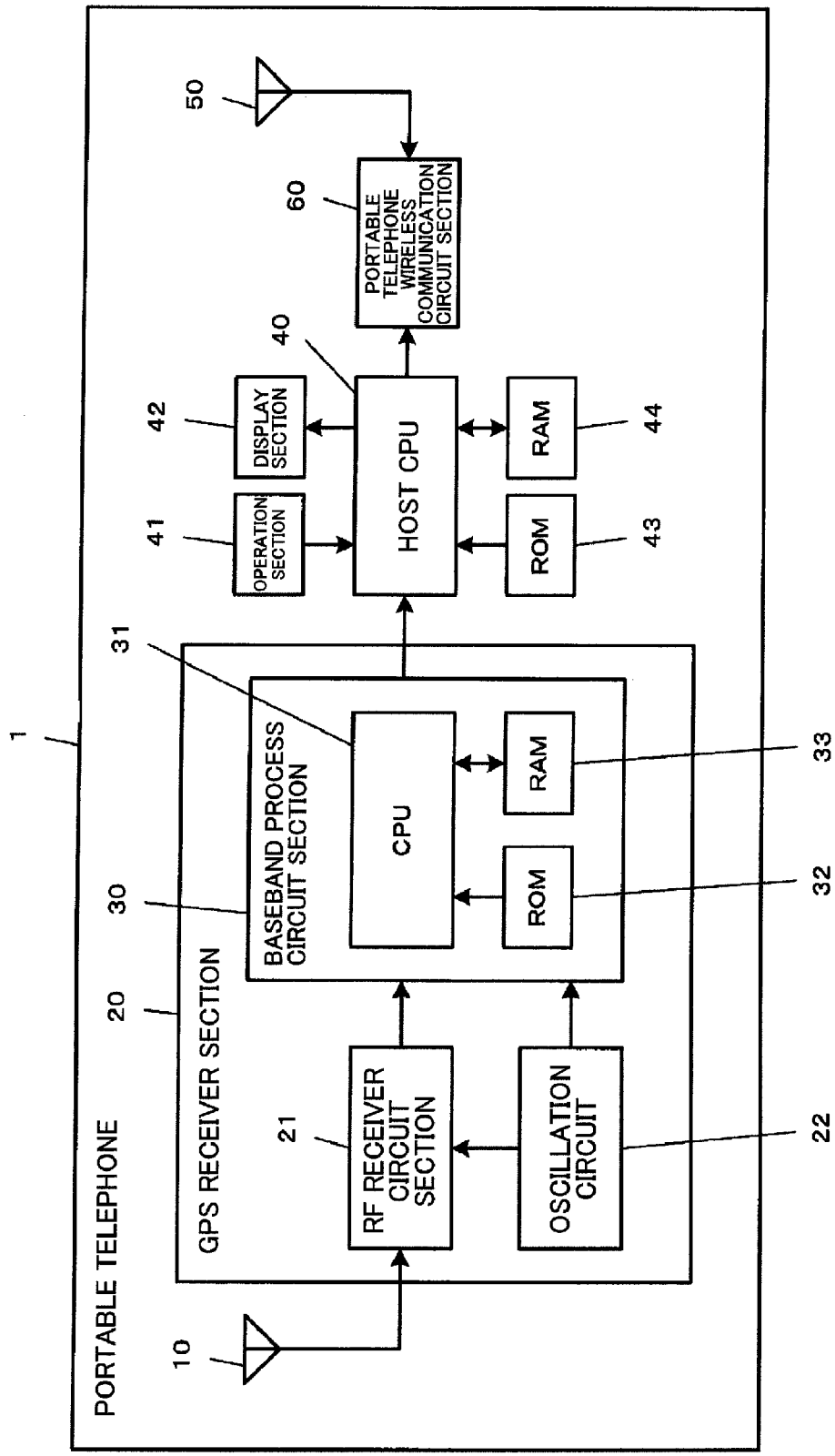
FIG. 1 is an internal configuration diagram of a portable telephone.

Several embodiments of the invention may enable whether to give priority to an increase in positioning accuracy or a reduction in TTFF to be appropriately determined depending on the reception environment when outputting the first positioning result.

According to one embodiment of the invention, there is provided a first output position calculation method that calculates a first located position to be output after starting positioning when receiving satellite signals transmitted from positioning satellites and performing present position positioning calculations based on the received satellite signals, the method comprising:

executing a positioning process that performs positioning calculations based on the received satellite signals to calculate a located position;

changing a repetitive execution count of the positioning process; and determining a final located position calculated when the positioning process has been executed in a number corresponding to the repetitive execution count to be a first located position to be output, the executing of the positioning process including:

selecting satellite sets based on the received satellite signals, each of the satellite sets being a combination of satellites used for a present positioning process;

calculating present position candidates corresponding to the respective selected satellite sets using the satellite signals from the satellites included in the respective selected satellite sets;

calculating APR values of the respective selected satellite sets, the APR value being the sum of the square of the difference between 1) a pseudo-range and 2) an approximate distance of a target satellite of a target satellite set, the approximate distance being a distance between the target satellite and the present position candidate of the target satellite set;

calculating an APR average value of the present positioning process by averaging the APR values of the respective satellite sets;

selecting a present position candidate from the present position candidates corresponding to the respective satellite sets and determining the selected present position candidate to be a located position determined by the present positioning process; and the changing of the repetitive execution count including changing the repetitive execution count based on the APR average value.

According to another embodiment of the invention, there is provided a positioning device that receives satellite signals transmitted from positioning satellites and performs present position positioning calculations based on the received satellite signals, the positioning device comprising:

a positioning section that executes a positioning process that performs positioning calculations based on the received satellite signals to calculate a located position;

a repetitive execution count change section that changes a repetitive execution count of the positioning process; and a first output position determination section that determines a final located position calculated when the positioning section has executed the positioning process in a number corresponding to the repetitive execution count to be the first located position, the positioning section including:

a satellite set selection section that selects satellite sets based on the received satellite signals, each of the satellite sets being a combination of satellites used for a present positioning process;

a present position candidate calculation section that calculates present position candidates corresponding to the respective selected satellite sets using the satellite signals from the satellites included in the respective selected satellite sets;

an APR value calculation section that calculates APR values of the respective selected satellite sets, the APR value being the sum of the square of the difference between 1) a pseudo-range and 2) an approximate distance of a target satellite of a target satellite set, the approximate distance being a distance between the target satellite and the present position candidate of the target satellite set; an average value calculation section that calculates an APR average value of the present positioning process by averaging the APR values of the respective satellite sets; and a present located position selection section that selects a present position candidate from the present position candidates corresponding to the respective satellite sets and determining the selected present position candidate to be a located position determined by the present positioning process; and the repetitive execution count change section including an APR average value reference count change section that changes the repetitive execution count based on the APR average value calculated by the positioning section.

According to the above configuration, the final located position calculated when the positioning process that calculates the located position has been executed in a number corresponding to the repetitive execution count is determined to be the first located position to be output. The repetitive execution count is changed based on the APR average value.

The APR value of the satellite set is calculated according to an equation (1) described later based on a pseudo-range ym and an approximate distance yp of each satellite included in the satellite set. The approximate distance yp of each satellite is calculated according to an equation (2) described later based on the position $(X_i, Y_i, Z_i)$ of that satellite and the present position $(x, y, z)$ calculated based on the satellite signal from each satellite included in the target satellite set.

The APR value and a positioning error have a relationship in which the positioning accuracy of the satellite set decreases as the APR value increases. A satellite signal affected by a multipath or the like is more likely included in the received satellite signals (i.e., multipath environment) as the APR average value increases. Specifically, the reception environment can be determined from the APR average value. Therefore, the TTFF required to output the first located position can be reduced corresponding to the reception environment by changing the repetitive execution count based on the APR average value. For example, the reception environment is likely to be the multipath environment (i.e., positioning accuracy is low) when the APR average value is large. In this case, priority is given to an increase in positioning accuracy by increasing the repetitive execution count. On the other hand, the reception environment is likely to be the open-sky environment (i.e., positioning accuracy is high) when the APR average value is small. In this case, priority is given to a reduction in TTFF by decreasing the repetitive execution count.

According to another embodiment of the invention, there is provided a first output position calculation method comprising:

selecting satellite sets, each of the satellite sets being a combination of satellites used for a present positioning process;

calculating present position candidates corresponding to the respective satellite sets using satellite signals from the satellites included in the respective satellite sets;

calculating APR values of the satellites of the respective satellite sets based on the present position candidates;

calculating an APR average value of the present positioning process by averaging the APR values of the respective satellite sets;

selecting a present position candidate from the present position candidates corresponding to the respective satellite sets and determining the selected present position candidate to be a located position determined by the present positioning process;

changing a repetitive execution count of the positioning process based on the APR average value; and determining a final located position calculated when the positioning process has been executed in a number corresponding to the repetitive execution count to be a first located position to be output.

According to another embodiment of the invention, there is provided a positioning device comprising:

a satellite set selection section that selects satellite sets, each of the satellite sets being a combination of satellites used for a present positioning process;

a present position candidate calculation section that calculates present position candidates corresponding to the respective satellite sets using satellite signals from the satellites included in the respective satellite sets;

an APR value calculation section that calculates APR values of the satellites of the respective satellite sets based on the present position candidates;

an average value calculation section that calculates an APR average value of the present positioning process by averaging the APR values of the respective satellite sets;

a present located position selection section that selects a present position candidate from the present position candidates corresponding to the respective satellite sets and determines the selected present position candidate to be a located position determined by the present positioning process;

an APR average value reference count change section that changes a repetitive execution count of the positioning process based on the APR average value; and a first output position determination section that determines a final located position calculated when the positioning process has been executed in a number corresponding to the repetitive execution count to be a first located position to be output.

In the first output position calculation method, the changing of the repetitive execution count may include changing the repetitive execution count based on the APR average value calculated by the present positioning process each time the positioning process is executed.

In the positioning device, the repetitive execution count change section may change the repetitive execution count based on the APR average value calculated by the present positioning process each time the positioning section executes the positioning process.

According to the above configuration, the repetitive execution count is changed based on the APR average value calculated by the present positioning process each time the positioning process is executed. The APR average value changes each time the positioning process is executed. Therefore, the repetitive execution count can be more appropriately determined by changing the repetitive execution count based on the APR average value calculated by the present positioning process each time the positioning process is executed.

The first output position calculation method may further include resetting and counting the repetitive execution count again when the difference between the located position determined by the preceding positioning process and the located position determined by the present positioning process does not satisfy a given short distance condition, and successively counting the repetitive execution count when the difference between the located position determined by the preceding positioning process and the located position determined by the present positioning process satisfies the given short distance condition.

The positioning device may further include a repetitive execution count counting section that resets and counts the repetitive execution count again when the difference between the located position determined by the preceding positioning process and the located position determined by the present positioning process does not satisfy a given short distance condition, and successively counts the repetitive execution count when the difference between the located position determined by the preceding positioning process and the located position determined by the present positioning process satisfies the given short distance condition.

According to the above configuration, the repetitive execution count is reset and counted again when the difference between the located position determined by the preceding positioning process and the located position determined by the present positioning process does not satisfy the given short distance condition, and is successively counted when the difference between the located position determined by the preceding positioning process and the located position determined by the present positioning process satisfies the given short distance condition. Specifically, the first located position is output when the number of times that the difference in located position successively satisfies the short distance condition has reached the repetitive execution count. Therefore, the first located position to be output is determined when a variation in located position has decreased in time series.

In the first output position calculation method, the calculating of the present position candidate may include calculating a time error using the satellite signals from the satellites included in the target satellite set;

the executing of the positioning process may include determining the time error calculated when calculating the present position candidate to be a time error determined by the present positioning process; and the method may further include resetting and counting the repetitive execution count again when the difference between the time error determined by the preceding positioning process and the time error determined by the present positioning process does not satisfy a given approximation condition, and successively counting the repetitive execution count when the difference between the time error determined by the preceding positioning process and the time error determined by the present positioning process satisfies the given approximation condition.

In the positioning device, the present position candidate calculation section may calculate a time error using the satellite signals from the satellites included in the target satellite set;

the positioning section may include a present time error determination section that determines the time error calculated when the present position candidate selected by the present located position selection section has been calculated by the present position candidate calculation section to be a time error determined by the present positioning process; and the positioning device may further include a repetitive execution count counting section that resets and counts the repetitive execution count again when the difference between the time error determined by the preceding positioning process and the time error determined by the present positioning process does not satisfy a given approximation condition, and successively counts the repetitive execution count when the difference between the time error determined by the preceding positioning process and the time error determined by the present positioning process satisfies the given approximation condition.

According to the above configuration, the time error is calculated using the satellite signals from the satellites included in the target satellite set when calculating the present position candidate, and the repetitive execution count is reset and counted again when the difference between the time error determined by the preceding positioning process and the time error determined by the present positioning process does not satisfy the given approximation condition, and is successively counted when the difference between the time error determined by the preceding positioning process and the time error determined by the present positioning process satisfies the given approximation condition. Specifically, the first located position is output when the number of times that the difference in time error successively satisfies the approximation condition has reached the repetitive execution count. Therefore, the first located position to be output is determined when a variation in time error has decreased in time series.

In the first output position calculation method, the calculating of the present position candidate may include calculating a time error using the satellite signals from the satellites included in the target satellite set;

the executing of the positioning process may include determining the time error calculated when calculating the present position candidate selected as the located position by the present positioning process to be a time error determined by the present positioning process; and the method may further include resetting and counting the repetitive execution count again when 1) the difference between the located position determined by the preceding positioning process and the located position determined by the present positioning process does not satisfy a given short distance condition or 2) the difference between the time error determined by the preceding positioning process and the time error determined by the present positioning process does not satisfy a given approximation condition, and successively counting the repetitive execution count when the difference between the located position determined by the preceding positioning process and the located position determined by the present positioning process satisfies the given short distance condition and the difference between the time error determined by the preceding positioning process and the time error determined by the present positioning process satisfies the given approximation condition.

In the positioning device, the present position candidate calculation section may calculate a time error using the satellite signals from the satellites included in the target satellite set;

the positioning section may include present time error determination section that determines the time error calculated when the present position candidate selected by the present located position selection section has been calculated by the present position candidate calculation section to be a time error determined by the present positioning process; and the positioning device may further include a repetitive execution count counting section that resets and counts the repetitive execution count again when 1) the difference between the located position determined by the preceding positioning process and the located position determined by the present positioning process does not satisfy a given short distance condition or 2) the difference between the time error determined by the preceding positioning process and the time error determined by the present positioning process does not satisfy a given approximation condition, and successively counts the repetitive execution count when the difference between the located position determined by the preceding positioning process and the located position determined by the present positioning process satisfies the given short distance condition and the difference between the time error determined by the preceding positioning process and the time error determined by the present positioning process satisfies the given approximation condition.

According to the above configuration, the time error is calculated using the satellite signals from the satellites included in the target satellite set when calculating the present position candidate, and the repetitive execution count is reset and counted again when 1) the difference between the located position determined by the preceding positioning process and the located position determined by the present positioning process does not satisfy the given short distance condition or 2) the difference between the time error determined by the preceding positioning process and the time error determined by the present positioning process does not satisfy the given approximation condition. The repetitive execution count is successively counted when the difference between the located position determined by the preceding positioning process and the located position determined by the present positioning process satisfies the given short distance condition and the difference between the time error determined by the preceding positioning process and the time error determined by the present positioning process satisfies the given approximation condition. Specifically, the first located position is output when the number of times that the difference in the located position successively satisfies the short distance condition has reached the repetitive execution count and the number of times that the difference in the time error successively satisfies the approximation condition has reached the repetitive execution count. Therefore, the first located position to be output is determined when variations in located position and time error in time series have decreased.

Another embodiment of the invention relates to a computer-readable storage medium storing a program that causes a computer to execute the above first output position calculation method, the computer being included in a positioning device that receives satellite signals transmitted from positioning satellites and locates a present position based on the received satellite signals.

The term "storage medium" used herein refers to a storage medium (e.g., hard disk, CD-ROM, DVD, memory card, or IC memory) from which information stored therein can be read by a computer.

A further embodiment of the invention relates to an electronic instrument comprising the above positioning device.

Preferred embodiments of the invention are described in detail below with reference to the drawings.

The following embodiments illustrate specific preferred examples of the invention, and are provided with various technologically preferred limitations. Note that the scope of the invention is not limited to the following embodiments unless there is a description which limits the invention.

An embodiment in which the invention is applied to a portable telephone is described below with reference to the drawings.

Configuration

FIG. 1 is a block diagram showing the internal configuration of a portable telephone 1 according to this embodiment. As shown in FIG. 1, the portable telephone 1 includes a GPS antenna 10, a GPS receiver section 20 (positioning device), a host central processing unit (CPU) 40, an operation section 41, a display section 42, a read-only memory (ROM) 43, a random access memory (RAM) 44, a portable telephone antenna 50, and a portable telephone wireless communication circuit section 60.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position of the portable telephone 1 by performing positioning calculations based on a navigation message and the like extracted from the GPS satellite signal. The GPS receiver section 20 includes a radio frequency (RF) receiver circuit section 21, an oscillation circuit 22, and a baseband process circuit section 30. The RF receiver circuit section 21 and the baseband process circuit section 30 may be produced as different large scale integrated (LSI) circuits, or may be produced in one chip.

The oscillation circuit 22 is a crystal oscillator or the like which generates and outputs an oscillation signal having a given oscillation frequency.

The RF receiver circuit section 21 multiplies the RF signal input from the GPS antenna 10 by a signal obtained by dividing or multiplying the frequency of the oscillation signal input from the oscillation circuit 22 to down-convert the RF signal into an intermediate-frequency signal (hereinafter referred to as "IF signal"). The RF receiver circuit section 21 amplifies the IF signal, converts the amplified signal into a digital signal using an A/D converter, and outputs the digital signal, for example.

The baseband process circuit section 30 is a circuit section which acquires/tracks the GPS satellite signal from the IF signal input from the RF receiver circuit section 21, and performs pseudo-range calculations, positioning calculations, and the like based on a navigation message, time information, and the like extracted by decoding data.

Specifically, the baseband process circuit section 30 acquires the GPS satellite signal based on the input IF signal. The baseband process circuit section 30 acquires the GPS satellite signal by extracting the GPS satellite signal from the IF signal by performing a correlation process on the IF signal. Specifically, the baseband process circuit section 30 performs a coherent process which calculates the correlation between the IF signal and a pseudo-generated C/A code replica (code replica) using FFT calculations, and an incoherent process which integrates the correlation values (i.e., the results of the coherent process) to calculate an integrated correlation value. As a result, the phases of the C/A code and a carrier frequency contained in the GPS satellite signal are obtained.

After acquiring the GPS satellite signal, the baseband process circuit section 30 tracks the acquired GPS satellite signal. The baseband process circuit section 30 tracks the GPS satellite signals by synchronously holding a plurality of acquired GPS satellite signals in parallel. For example, the baseband process circuit section 30 performs a code loop which is implemented by a delay locked loop (DLL) and tracks the phase of the C/A code, and a carrier loop which is implemented by a phase locked loop (PLL) and tracks the phase of the carrier frequency. The baseband process circuit section 30 extracts the navigation message by decoding data contained in each GPS satellite signal which has been tracked, and performs pseudo-range calculations, positioning calculations, and the like to locate the present position.

The baseband process circuit section 30 includes a CPU 31, a ROM 32, and a RAM 33. The baseband process circuit section 30 also includes various circuits such as a C/A code replica generation circuit, a correlation calculation circuit, and a data decoder circuit.

The CPU 31 controls each section of the baseband process circuit section 30 and the RF receiver circuit section 21, and performs various calculations including a baseband process described later.

In the baseband process, the CPU 31 decodes the navigation message included in the acquired and tracked GPS satellite signal, and calculates the present position of the portable telephone 1 based on orbit information and time information of the GPS satellite included in the decoded navigation message. Specifically, the CPU 31 calculates the position of each GPS satellite and the pseudo-range between the GPS receiver and each GPS satellite when the GPS satellite has transmitted the GPS satellite signal based on the difference between the time at which each GPS satellite has transmitted the GPS satellite signal and the time at which the GPS receiver has received the GPS satellite signal. The CPU 31 calculates the present position by solving simultaneous equations in which the present position and a time error between the GPS satellite and the GPS receiver are unknown quantities. The CPU 31 can calculate the present position by receiving GPS satellite signals from at least four GPS satellites. This is because the coordinate values (x,y,z) of the present position (i.e., three-dimensional position) and a time error T between the GPS satellite and the GPS receiver are used as unknown quantities.

Specifically, the CPU 31 repeats a positioning process which calculates a present position P of the portable telephone 1 at given time intervals (e.g., intervals of one second). In the positioning process, the CPU 31 selects satellite sets (e.g., combinations of four or more GPS satellites) based on the acquired GPS satellite signals. For example, when eight GPS satellite signals have been acquired, the CPU 31 selects 163 (=8C8+8C7+8C6+8C5+8C4) satellite sets. The CPU 31 then performs positioning calculations corresponding to each selected satellite set using a least-square method or the like to calculate present position candidates of the portable telephone 1 (i.e., present position candidates for the position of the portable telephone 1) and time error candidates. The CPU 31 selects one satellite set from the satellite sets based on a given criterion, for example. The CPU 31 determines the present position candidate corresponding to the selected satellite set to be the present position P, and determines the time error candidate corresponding to the selected satellite set to be the present time error T. As the criterion, a position dilution of precision (PDOP) based on the constellation of the GPS satellites of the satellite set, or the signal strength of each GPS satellite signal may be used, for example. Note that about several tens of satellite sets made up of six or more GPS satellites may be extracted from the satellite sets generated based on the acquired GPS satellite signals, and the located position and the time error may be determined based on the extracted satellite sets, for example.

In this embodiment, the positioning process is repeated one or more times immediately after starting positioning (first positioning), and the present position P calculated by the final positioning process is output as the first located position. After the first located position has been determined and output, the present position P calculated by each positioning process is output (positioning output) as the located position.

In the first positioning, when the present position P and the time error T have been calculated by each positioning process, the difference (position difference) $\Delta P$ between the calculated present position P and a present position P0 calculated by the preceding positioning process is calculated. When the calculated position difference $\Delta P$ satisfies a predetermined short distance condition (e.g., 200 m or less), a position counter is incremented (updated) by one. When the calculated position difference $\Delta P$ does not satisfy the short distance condition, the position counter is cleared to zero. The position counter has been cleared to zero when starting positioning. Specifically, the count value (position count value) of the position counter indicates the number of times that the position difference $\Delta P$ has consecutively become equal to or less than a given value.

The difference (time difference) $\Delta T$ between the present time error T and a time error T0 calculated by the preceding positioning process is also calculated. When the calculated time difference $\Delta T$ satisfies a predetermined approximation condition (e.g., 0.02 seconds or less), a time counter is incremented (updated) by one. When the calculated time difference $\Delta T$ does not satisfy the approximation condition, the time counter is cleared to zero. The time counter has been cleared to zero when starting positioning. Specifically, the count value (time count value) of the time counter indicates the number of times that the time difference ΔT has consecutively become equal to or less than a given value.

Also, a position threshold value and a time threshold value are determined. Specifically, a predetermined reference threshold value (e.g., "3") is increased or decreased by an amount corresponding to an APR average value in the present positioning process to determine the position threshold value and the time threshold value. The APR average value is the average value of a priori residual (APR)(APR values) of the satellite sets selected in the present positioning process.

The count values are respectively compared with the threshold values. When the position count value has reached the position threshold value and the time count value has reached the time threshold value, the present position P is determined to be the first located position and is output. When the position count value has not reached the position threshold value or the time count value has not reached the time threshold value, the next positioning process is performed.

The a priori residual (APR)(APR value) of a satellite set is given by the following equation (1):

$$APR = \sum_{i}^{N} (ym_i - yp_i)^2 \quad (1)$$

where, N is the number of GPS satellites (number of satellites) included in the target satellite set, and i (=1, 2, ..., and N) indicates the ith GPS satellite among the GPS satellites included in the target satellite set. $ym_i$ is the pseudo-range between the ith GPS satellite and the portable telephone 1. $yp_i$ is the distance (approximate distance) between the position $(X_i, Y_i, Z_i)$ of the ith GPS satellite and the present position (x, y, z) of the portable telephone 1 obtained by positioning calculations, and is given by the following equation (2).

$$yp_i = \sqrt{(X_i-x)^2+(Y_i-y)^2+(Z_i-z)^2} \quad (2)$$

Specifically, the APR value is given as the sum of the square of the difference between the pseudo-range ym and the approximate distance yp of each GPS satellite of the target satellite set.

Figures 2A, 2B, 3:
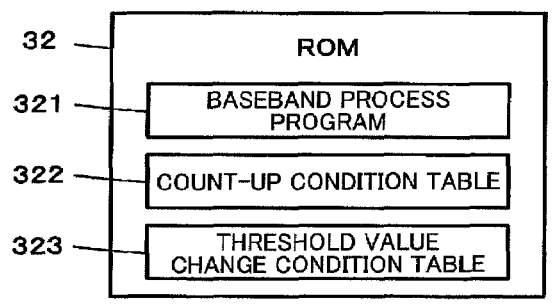
FIGS. 2A and 2B show examples of experimental results indicating the relationship between an APR average value and a positioning error.
FIG. 3 is a configuration diagram of a ROM.

FIGS. 2A and 2B show examples of experimental results indicating the relationship between the APR value and positioning accuracy. FIG. 2A shows experimental results in a multipath environment, and FIG. 2B shows experimental results in an open-sky environment. The present position of the portable telephone 1 is known. FIGS. 2A and 2B show the positioning results in the multipath environment and the open-sky environment in time series from the start of positioning. A satellite set (selected satellite set) selected in the positioning process, an APR average value, and a horizontal error are provided as the positioning results. The term "APR average value" refers to the average value of the APR values of the satellite set selected in the positioning process. The term "horizontal error" refers to the horizontal difference between the known position of the portable telephone 1 and the present position P calculated by the positioning process. The Z-count is decoded in the fifth positioning process in each reception environment. Specifically, the first to fourth positioning processes are performed before the Z-count is decoded, and the fifth and subsequent positioning processes are performed after the Z-count has been decoded.

As shown in FIGS. 2A and 2B, the larger the APR average value, the larger the horizontal error (i.e., the lower the positioning accuracy) is.

When comparing the multipath environment and the open-sky environment, the APR value and the horizontal error are larger in the multipath environment as compared with the open-sky environment. This means that the reception environment can be determined from the APR average value. Specifically, the reception environment is likely to be the multipath environment when the APR average value is large, and is likely to be the open-sky environment when the APR average value is small.

In the multipath environment, the horizontal error is large and varies to a large extent before the Z-count is decoded, but decreases and varies to a small extent after the Z-count has been decoded. The APR average value also decreases accompanying a decrease in horizontal error after the Z-count has been decoded. Specifically, it is desirable to output the first located position after the Z-count has been decoded in the multipath environment.

In the open-sky environment, the horizontal error varies to only a small extent regardless of whether or not the Z-count has been decoded. The APR average value also varies to only a small extent regardless of whether or not the Z-count has been decoded. Specifically, the first located position may be output before the Z-count is decoded in the open-sky environment.

In this embodiment, the output timing of the first located position is determined based on the relationship between the APR average value and the positioning accuracy. Specifically, whether or not the variation in the present position P has decreased is determined depending on whether or not the position count value has reached the position threshold value, and whether or not the variation in the time error T has decreased is determined depending on whether or not the time count value has reached the time threshold value. The first located position is output at a timing when it has been determined that the variation in the present position P and the variation in the time error T have decreased.

The position threshold value and the time threshold value are determined based on the APR average value in each positioning process. Therefore, the output timing of the first located position is changed corresponding to the reception environment of the present positioning process even during travel. Specifically, when the reception environment is likely to be the multipath environment (i.e., APR average value is large), the position threshold value and the time threshold value are increased to delay the output timing of the first located position. When the reception environment is likely to be the open-sky environment (i.e., APR average value is small), the position threshold value and the time threshold value are decreased to advance the output timing of the first located position.

Again referring to FIG. 1, the ROM 32 stores a system program which causes the CPU 31 to control each section of the baseband process circuit section 30 and the RF receiver circuit section 21, and a program and data necessary for the CPU 31 to implement various processes including the baseband process. FIG. 3 shows an example of the configuration of the ROM 32. As shown in FIG. 3, the ROM 32 stores a baseband process program 321, a count-up condition table 322, and a threshold value change condition table 323.

The count-up condition table 322 is a data table which defines conditions whereby the position counter and the time counter are incremented. FIG. 4 shows an example of the data configuration of the count-up condition table 322. As shown in FIG. 4, the count-up condition table 322 stores conditions whereby the count values of the position counter and the time counter are incremented. Specifically, a position difference ΔP by which the variation in the present position P in each positioning process is considered to be small is defined as the short distance condition for the position counter. A time difference ΔT by which the variation in the time error T in each positioning process is considered to be small is defined as the approximation condition for the time counter.

The threshold value change condition table 323 is a data table which defines conditions whereby the position threshold value and the time threshold value are changed. FIG. 5 shows an example of the data configuration of the threshold value change condition table 323. As shown in FIG. 5, a threshold value change condition 323a and a threshold value change amount 323b are stored in the threshold value change condition table 323 while being associated with each other. Condition values for the number of satellites, the PDOP value, and the APR average value are stored as the change condition 323a. The reception environment is likely to be the open-sky environment when the APR average value is small, and is likely to be the multipath environment when the APR average value is large, as described above. Therefore, the threshold value of the APR average value is decreased when the APR average value is small by setting the change amount to be a negative value, and is increased when the APR average value is large by setting the change amount to be a positive value. The positioning accuracy generally increases as the PDOP value decreases. Therefore, the threshold value of the PDOP value is decreased when the PDOP value is large by setting the change amount to be a negative value. The positioning accuracy generally increases as the number of satellites increases (i.e., the PDOP value decreases). Therefore, the threshold value of the number of satellites is decreased when the number of satellites is large by setting the change amount to be a negative value.

The RAM 33 is used as a work area for the CPU 31, and temporarily stores a program and data read from the ROM 32, results of calculations performed by the CPU 31 based on various programs, and the like. FIG. 6 shows an example of the configuration of the RAM 33. As shown in FIG. 6, the RAM 33 stores satellite position data 331, satellite set data 332, and positioning result data 333.

The satellite set data 331 is data relating to the position of a GPS satellite acquired in each positioning process. FIG. 7 shows an example of the data configuration of the satellite position data 331. As shown in FIG. 7, a satellite position 331b calculated based on the GPS satellite signal is stored as the satellite position data 331 corresponding to each GPS satellite 331a acquired.

The satellite set data 332 is data relating to the satellite set selected in each positioning process. FIG. 8 shows an example of the data configuration of the satellite set data 332. As shown in FIG. 8, a GPS satellite 332b included in the selected satellite set, a present position candidate 332c, a time error candidate 332d, a number of satellites 332e, a PDOP value 332f, and an APR value 332g are stored as the satellite set data 332 corresponding to each satellite set 332a selected.

Figures 9, 10:
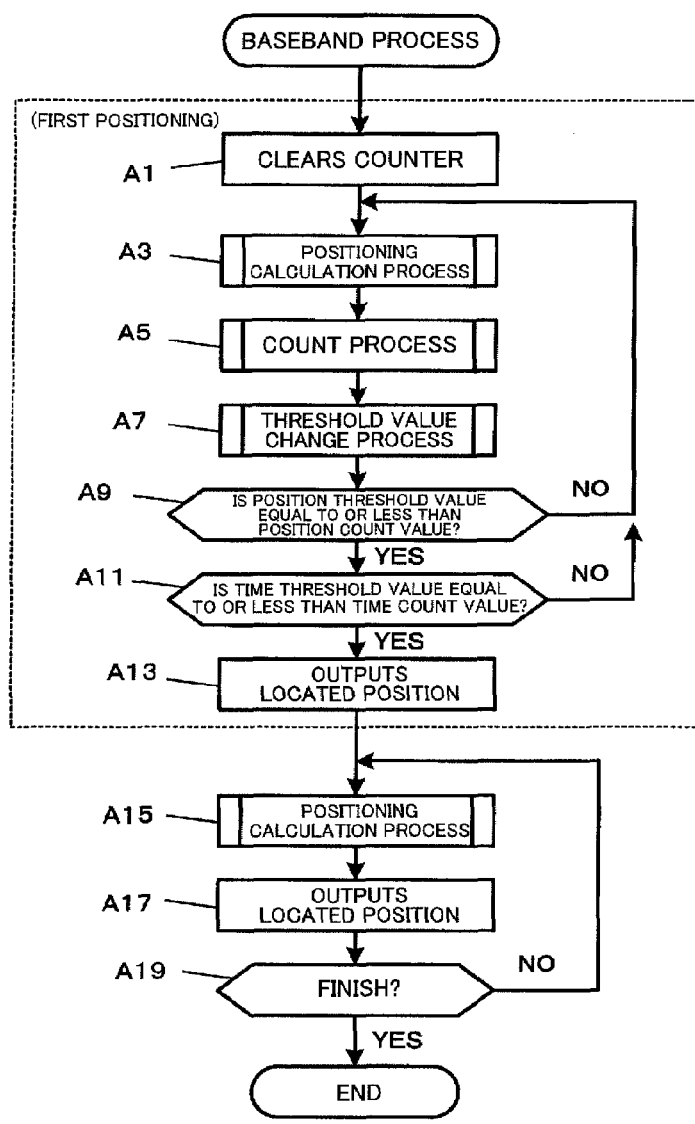
FIG. 9 shows a data configuration example of positioning result data.
FIG. 10 is a flowchart of a baseband process.

The positioning result data 333 is data relating to calculation results of each positioning process. FIG. 9 shows an example of the data configuration of the positioning result data 333. As shown in FIG. 9, a positioning time 333a, a selected satellite set 333b, a located position 333c, a time error 333d, a number of satellites 333e, a PDOP value 333f, and an APR average value 333g are stored as the positioning result data 333 corresponding to each positioning process from the start of positioning.

The present count values of the position counter and the time counter are stored as counter data 334. The present position threshold value and the present time threshold value are stored as data 335.

The host CPU 40 controls each section of the portable telephone 1 based on various programs such as a system program stored in the ROM 43. Specifically, the host CPU 40 mainly implements a telephone call function, and performs a process for implementing various functions including a navigation function such as causing the display section 42 to display a navigation screen in which the present position of the portable telephone 1 input from the baseband process circuit section 30 is plotted on a map.

The operation section 41 is an input device including an operation key, a button switch, and the like. The operation section 41 outputs an operation signal corresponding to the operation of the user to the host CPU 40. Various instructions such as a positioning start/finish instruction are input by operating the operation section 41. The display section 42 is a display device such as a liquid crystal display (LCD). The display section 42 displays a display screen (e.g., navigation screen and time information) based on a display signal input from the host CPU 40.

The ROM 43 stores a system program which causes the host CPU 40 to control the portable telephone 1, a program and data necessary for implementing a navigation function, and the like. The RAM 44 is used as a work area for the host CPU 40. The RAM 44 temporarily stores a program and data read from the ROM 43, data input from the operation section 41, results of calculations performed by the host CPU 40 based on various programs, and the like.

The portable telephone antenna 50 is an antenna which transmits and receives a portable telephone radio signal between the portable telephone 1 and a radio base station installed by a communication service provider of the portable telephone 1. The portable telephone wireless communication circuit section 60 is a portable telephone communication circuit section which includes an RF conversion circuit, a baseband process circuit, and the like, and transmits and receives a radio signal under control of the host CPU 40.

Process flow

FIG. 10 is a flowchart illustrative of the flow of the baseband process. The baseband process is implemented by causing the CPU 31 to execute the baseband process program 321. A digital IF signal obtained by down-converting an RF signal received by the GPS antenna 10 into an IF signal by the RF receiver circuit section 21 is input to the baseband process circuit section 30 before the baseband process.

As shown in FIG. 10, the CPU 31 clears the position counter and the time counter to zero as an initial setting (step A1). The CPU 31 then performs a positioning calculation process to calculate the present position P and the time error T (step A3).

Figure 11:
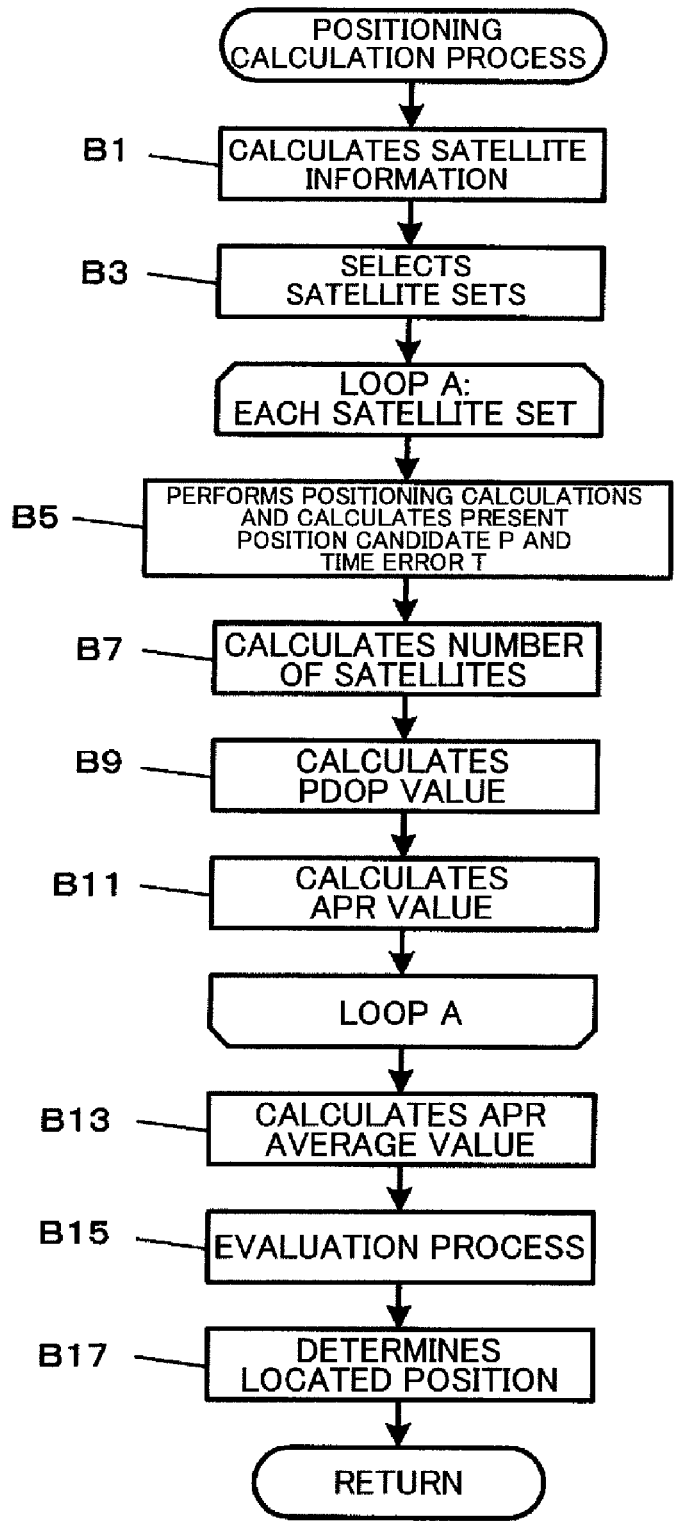
FIG. 11 is a flowchart of a positioning calculation process executed during the baseband process.

FIG. 11 is a flowchart illustrative of the flow of the positioning calculation process. As shown in FIG. 11, the CPU 31 calculates satellite information (including the position) relating to each GPS satellite based on the acquired GPS satellite signal (step B1). The CPU 31 selects satellite sets made up of four or more GPS satellites based on the acquired satellite signals (step B3), and performs a loop A process on each satellite set selected.

In the loop A, the CPU 31 calculates the present position candidate (for the position of the portable telephone 1) and the time error candidate by performing positioning calculations using a least-square method or the like based on the position of each GPS satellite of the target satellite set (step B5). The CPU 31 calculates the number of GPS satellites (number of satellites) included in the target satellite set (step B7). The CPU 31 calculates the PDOP value of the target satellite set based on the calculated present position candidate (step B9), and then calculates the APR value (step B11). The loop A is thus performed.

When the CPU 31 has performed the loop A process on all satellite sets, the CPU 31 calculates the APR average value of each satellite set (step B13). The CPU 31 performs an evaluation process which evaluates each satellite set using the PDOP value and the like (step B15). The CPU 31 selects one satellite set based on the evaluation results. The CPU 31 determines the present position candidate corresponding to the selected satellite set to be the present located position, and determines the time error candidate corresponding to the selected satellite set to be the present time error (step B17). The CPU 31 thus completes the positioning calculation process.

After completion of the positioning calculation process, the CPU 31 performs a count process (step A5).

Figure 12:
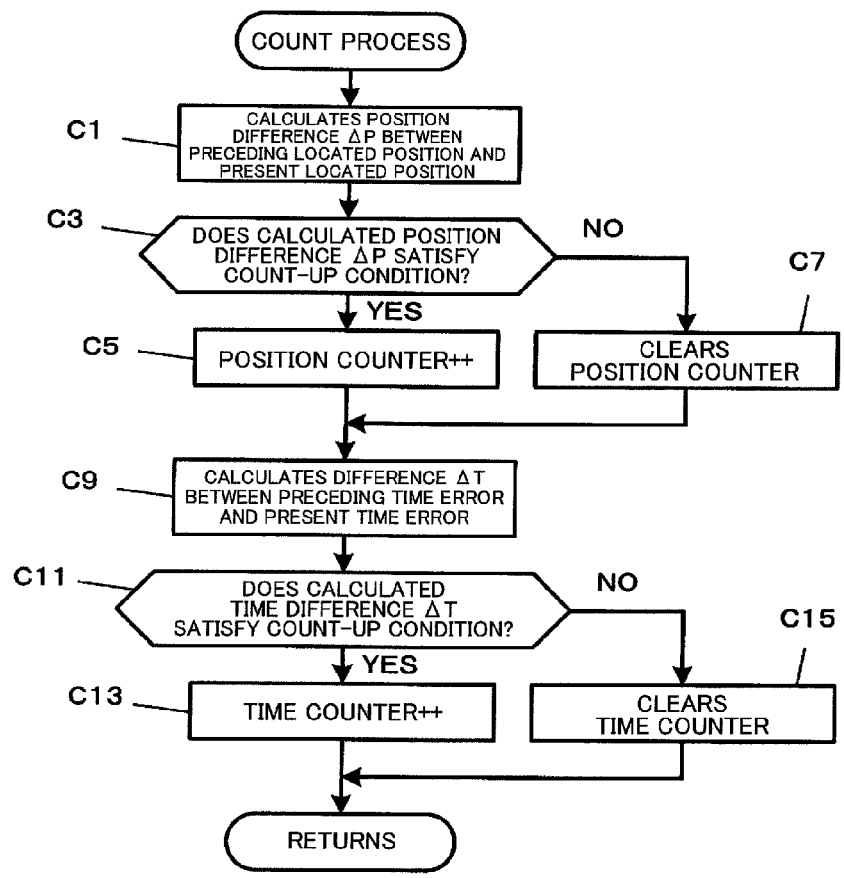
FIG. 12 is a flowchart of a count process executed during the baseband process.

FIG. 12 is a flowchart illustrative of the flow of the count process. As shown in FIG. 12, the CPU 31 calculates the difference (position difference) ΔP between the preceding located position and the present located position (step C1). When the calculated position difference ΔP satisfies the count-up condition (i.e., equal to or less than a given value) (step C3: YES), the CPU 31 increments the position counter by one (step C5). When the calculated position difference ΔP does not satisfy the count-up condition (step C3: NO), the CPU 31 clears the position counter to zero (step C7).

The CPU 31 calculates the difference (time difference) ΔT between the preceding time error and the present time error (step C9). When the calculated time difference ΔT satisfies the count-up condition (i.e., equal to or less than a given value) (step C11: YES), the CPU 31 increments the time counter by one (step C13). When the calculated time difference ΔT does not satisfy the count-up condition (step C11: NO), the CPU 31 clears the time counter to zero (step C15). The CPU 31 thus completes the count process.

After completion of the count process, the CPU 31 performs a threshold value change process (step A7).

Figure 13:
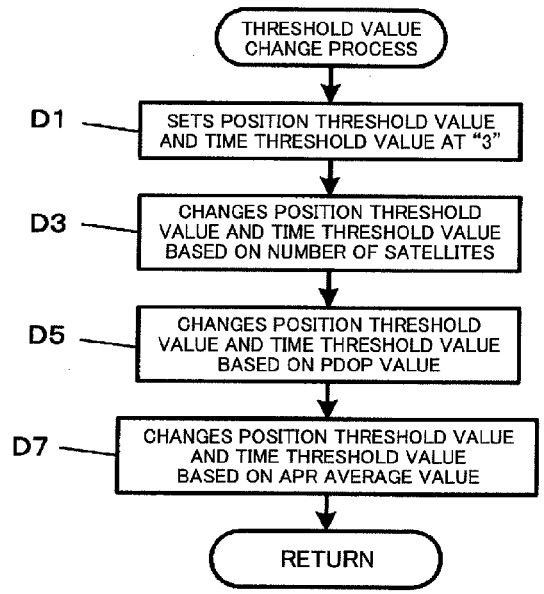
FIG. 13 is a flowchart of a threshold value change process executed during the baseband process.

FIG. 13 is a flowchart illustrative of the flow of the threshold value change process. As shown in FIG. 13, the CPU 31 sets the position threshold value and the time threshold value at a reference threshold value "3" as an initial setting (step D1). The CPU 31 changes the position threshold value and the time threshold value based on the number of satellites referring to the threshold value change condition table 323 (step D3). The CPU 31 changes the position threshold value and the time threshold value based on the PDOP value (step D5), and changes the position threshold value and the time threshold value based on the APR average value (step D7). The CPU 31 thus completes the threshold value change process.

After completion of the threshold value change process, the CPU 31 compares the position count value with the position threshold value, and compares the time count value with the time threshold value. When the position count value is less than the position threshold value (step A9: NO) or the time count value is less than the time threshold value (step A11: NO), the CPU 31 returns to the step A3 and performs the next positioning. When the position count value is equal to or larger than the position threshold value (step A9: YES) and the time count value is equal to or larger than the time threshold value (step A11: YES), the CPU 31 determines the present position P to be the first located position and outputs the first located position (step A13). The first positioning is thus completed.

After completion of the first positioning, the CPU 31 starts second or subsequent positioning. Specifically, the CPU 31 performs the positioning calculation process (see FIG. 11) (step A15), and outputs the calculated present position P as the positioning result (step A17). The CPU 31 then determines whether or not to finish positioning. When the CPU 31 has determined to continue positioning (step A19: NO), the CPU 31 returns to the step A15 and performs the next positioning. When the CPU 31 has determined to finish positioning (step A19: YES), the CPU 31 finishes the baseband process.

Modification

The embodiments to which the invention is applied have been described above. Note that embodiments to which the invention may be applied are not limited to the above-described embodiments. Various modifications and variations may be made without departing from the spirit and scope of the invention.

(A) Decoding of Z-Count

For example, a variation in the time error T becomes almost zero even in the multipath environment after the Z-count has been decoded. Therefore, when the Z-count has been decoded, the present position P may be determined to be and output as the located position without comparing the count value with the threshold value.

(B) Host CPU

Some or all of the processes performed by the CPU 31 of the baseband process circuit section 30 may be performed by the host CPU 40 by means of software.

(C) Positioning Device

The above embodiments have been described taking an example of a portable telephone which is an electronic instrument including a positioning device. Note that the invention may also be applied to other electronic instruments such as a portable navigation system, a car navigation system, a personal digital assistant (PDA), and a wristwatch.

(D) Satellite Positioning System

The above embodiments have been described taking an example utilizing the GPS. Note that the invention may also be applied to other satellite positioning systems such as the global navigation satellite system (GLONASS).

(E) Recording Medium

A configuration may be employed in which the baseband process program 321 is recorded on a recording medium such as a CD-ROM and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A first output position calculation method that calculates a first located position to be output after starting positioning when receiving satellite signals transmitted from positioning satellites and performing present position positioning calculations based on the received satellite signals, the method comprising:

executing a positioning process that performs positioning calculations based on the received satellite signals to calculate a located position;

changing a repetitive execution count of the positioning process; and determining a final located position calculated when the positioning process has been executed in a number corresponding to the repetitive execution count to be a first located position to be output, the executing of the positioning process including:
   selecting satellite sets based on the received satellite signals, each of the satellite sets being a combination of satellites used for a present positioning process;
   calculating present position candidates corresponding to the respective selected satellite sets using the satellite signals from the satellites included in the respective selected satellite sets;
   calculating APR (A Priori Residual) values of the respective selected satellite sets, the APR value being the sum of the square of the difference between 1) a pseudo-range and 2) an approximate distance of a target satellite of a target satellite set, the approximate distance being a distance between the target satellite and the present position candidate of the target satellite set;
   calculating an APR average value of the present positioning process by averaging the APR values of the respective satellite sets;
   selecting a present position candidate from the present position candidates corresponding to the respective satellite sets and determining the selected present position candidate to be a located position determined by the present positioning process; and
   the changing of the repetitive execution count including changing the repetitive execution count based on the APR average value.

2. The first output position calculation method as defined in claim 1,
   the changing of the repetitive execution count including changing the repetitive execution count based on the APR average value calculated by the present positioning process each time the positioning process is executed.

3. The first output position calculation method as defined in claim 1,
   the method further including resetting and counting the repetitive execution count again when the difference between the located position determined by the preceding positioning process and the located position determined by the present positioning process does not satisfy a given short distance condition, and successively counting the repetitive execution count when the difference between the located position determined by the preceding positioning process and the located position determined by the present positioning process satisfies the given short distance condition.

4. The first output position calculation method as defined in claim 1,
   the calculating of the present position candidate including calculating a time error using the satellite signals from the satellites included in the target satellite set;
   the executing of the positioning process including determining the time error calculated when calculating the present position candidate to be a time error determined by the present positioning process; and
   the method further including resetting and counting the repetitive execution count again when the difference between the time error determined by the preceding positioning process and the time error determined by the present positioning process does not satisfy a given approximation condition, and successively counting the repetitive execution count when the difference between the time error determined by the preceding positioning process and the time error determined by the present positioning process satisfies the given approximation condition.

5. The first output position calculation method as defined in claim 1,
   the calculating of the present position candidate including calculating a time error using the satellite signals from the satellites included in the target satellite set;
   the executing of the positioning process including determining the time error calculated when calculating the present position candidate selected as the located position by the present positioning process to be a time error determined by the present positioning process; and
   the method further including resetting and counting the repetitive execution count again when 1) the difference between the located position determined by the preceding positioning process and the located position determined by the present positioning process does not satisfy a given short distance condition or 2) the difference between the time error determined by the preceding positioning process and the time error determined by the present positioning process does not satisfy a given approximation condition, and successively counting the repetitive execution count when the difference between the located position determined by the preceding positioning process and the located position determined by the present positioning process satisfies the given short distance condition and the difference between the time error determined by the preceding positioning process and the time error determined by the present positioning process satisfies the given approximation condition.

6. A first output position calculation method comprising:
   selecting satellite sets, each of the satellite sets being a combination of satellites used for a present positioning process;
   calculating present position candidates corresponding to the respective satellite sets using satellite signals from the satellites included in the respective satellite sets;
   calculating APR (A Priori Residual) values of the satellites of the respective satellite sets based on the present position candidates;
   calculating an APR average value of the present positioning process by averaging the APR values of the respective satellite sets;
   selecting a present position candidate from the present position candidates corresponding to the respective satellite sets and determining the selected present position candidate to be a located position determined by the present positioning process;
   changing a repetitive execution count of the positioning process based on the APR average value; and
   determining a final located position calculated when the positioning process has been executed in a number corresponding to the repetitive execution count to be a first located position to be output.

7. A computer-readable storage medium storing a program that causes a computer to execute a first output position calculation method that calculates a first located position to be output after starting positioning, the computer being included in a positioning device that receives satellite signals transmitted from positioning satellites and locates a present position of the positioning device based on the received satellite signals, the first output position calculation method comprising:
   executing a positioning process that performs positioning calculations based on the received satellite signals to calculate a located position;
   changing a repetitive execution count of the positioning process; and
   determining a final located position calculated when the positioning process has been executed in a number corresponding to the repetitive execution count to be the first located position, the executing of the positioning process including:
selecting satellite sets based on the received satellite signals, each of the satellite sets being a combination of satellites used for a present positioning process;
calculating present position candidates corresponding to the respective selected satellite sets using the satellite signals from the satellites included in the respective selected satellite sets;
calculating APR (A Priori Residual) values of the respective selected satellite sets, the APR value being the sum of the square of the difference between 1) a pseudo-range and 2) an approximate distance of a target satellite of a target satellite set, the approximate distance being a distance between the target satellite and the present position candidate of the target satellite set;
calculating an APR average value of the present positioning process by averaging the APR values of the respective satellite sets;
selecting a present position candidate from the present position candidates corresponding to the respective satellite sets and determining the selected present position candidate to be a located position determined by the present positioning process; and
the changing of the repetitive execution count including changing the repetitive execution count based on the APR average value.

8. A computer-readable storage medium storing a program that causes a computer to execute a first output position calculation method that calculates a first located position to be output after starting positioning, the computer being included in a positioning device that receives satellite signals transmitted from positioning satellites and locates a present position of the positioning device based on the received satellite signals, the first output position calculation method comprising:
selecting satellite sets, each of the satellite sets being a combination of satellites used for a present positioning process;
calculating present position candidates corresponding to the respective satellite sets using satellite signals from the satellites included in the respective satellite sets;
calculating APR (A Priori Residual) values of the satellites of the respective satellite sets based on the present position candidates;
calculating an APR average value of the present positioning process by averaging the APR values of the respective satellite sets;
selecting a present position candidate from the present position candidates corresponding to the respective satellite sets and determining the selected present position candidate to be a located position determined by the present positioning process;
changing a repetitive execution count of the positioning process based on the APR average value; and
determining a final located position calculated when the positioning process has been executed in a number corresponding to the repetitive execution count to be the first located position.

9. A positioning device that receives satellite signals transmitted from positioning satellites and performs present position positioning calculations based on the received satellite signals, the positioning device comprising:
a positioning section that executes a positioning process that performs positioning calculations based on the received satellite signals to calculate a located position;
a repetitive execution count change section that changes a repetitive execution count of the positioning process; and a first output position determination section that determines a final located position calculated when the positioning section has executed the positioning process in a number corresponding to the repetitive execution count to be the first located position,
the positioning section including:
a satellite set selection section that selects satellite sets based on the received satellite signals, each of the satellite sets being a combination of satellites used for a present positioning process;
a present position candidate calculation section that calculates present position candidates corresponding to the respective selected satellite sets using the satellite signals from the satellites included in the respective selected satellite sets;
an APR value calculation section that calculates APR (A Priori Residual) values of the respective selected satellite sets, the APR value being the sum of the square of the difference between 1) a pseudo-range and 2) an approximate distance of a target satellite of a target satellite set, the approximate distance being a distance between the target satellite and the present position candidate of the target satellite set; an average value calculation section that calculates an APR average value of the present positioning process by averaging the APR values of the respective satellite sets; and
a present located position selection section that selects a present position candidate from the present position candidates corresponding to the respective satellite sets and determining the selected present position candidate to be a located position determined by the present positioning process; and
the repetitive execution count change section including an APR average value reference count change section that changes the repetitive execution count based on the APR average value calculated by the positioning section.

10. The positioning device as defined in claim 9,
the repetitive execution count change section changing the repetitive execution count based on the APR average value calculated by the present positioning process each time the positioning section executes the positioning process.

11. The positioning device as defined in claim 9,
the positioning device further including a repetitive execution count counting section that resets and counts the repetitive execution count again when the difference between the located position determined by the preceding positioning process and the located position determined by the present positioning process does not satisfy a given short distance condition, and successively counts the repetitive execution count when the difference between the located position determined by the preceding positioning process and the located position determined by the present positioning process satisfies the given short distance condition.

12. The positioning device as defined in claim 9,
the present position candidate calculation section calculating a time error using the satellite signals from the satellites included in the target satellite set;
the positioning section including a present time error determination section that determines the time error calculated when the present position candidate selected by the present located position selection section has been calculated by the present position candidate calculation section to be a time error determined by the present positioning process; and the positioning device further including a repetitive execution count counting section that resets and counts the repetitive execution count again when the difference between the time error determined by the preceding positioning process and the time error determined by the present positioning process does not satisfy a given approximation condition, and successively counts the repetitive execution count when the difference between the time error determined by the preceding positioning process and the time error determined by the present positioning process satisfies the given approximation condition.

13. The positioning device as defined in claim 9,
the present position candidate calculation section calculating a time error using the satellite signals from the satellites included in the target satellite set;
the positioning section including present time error determination section that determines the time error calculated when the present position candidate selected by the present located position selection section has been calculated by the present position candidate calculation section to be a time error determined by the present positioning process; and
the positioning device further including a repetitive execution count counting section that resets and counts the repetitive execution count again when 1) the difference between the located position determined by the preceding positioning process and the located position determined by the present positioning process does not satisfy a given short distance condition or 2) the difference between the time error determined by the preceding positioning process and the time error determined by the present positioning process does not satisfy a given approximation condition, and successively counts the repetitive execution count when the difference between the located position determined by the preceding positioning process and the located position determined by the present positioning process satisfies the given short distance condition and the difference between the time error determined by the preceding positioning process and the time error determined by the present positioning process satisfies the given approximation condition.

14. A positioning device comprising:
a satellite set selection section that selects satellite sets, each of the satellite sets being a combination of satellites used for a present positioning process;
a present position candidate calculation section that calculates present position candidates corresponding to the respective satellite sets using satellite signals from the satellites included in the respective satellite sets;
an APR value calculation section that calculates APR (A Priori Residual) values of the satellites of the respective satellite sets based on the present position candidates;
an average value calculation section that calculates an APR average value of the present positioning process by averaging the APR values of the respective satellite sets;
a present located position selection section that selects a present position candidate from the present position candidates corresponding to the respective satellite sets and determines the selected present position candidate to be a located position determined by the present positioning process;
an APR average value reference count change section that changes a repetitive execution count of the positioning process based on the APR average value; and
a first output position determination section that determines a final located position calculated when the positioning process has been executed in a number corresponding to the repetitive execution count to be a first located position to be output.

15. An electronic instrument comprising the positioning device as defined in claim 9.

16. An electronic instrument comprising the positioning device as defined in claim 14.

* * * * *